Dec. 10, 1963 A. H. FAULKNER 3,114,006

DATA STORAGE UNIT

Filed April 9, 1958 2 Sheets-Sheet 1

INVENTOR.
ALFRED H. FAULKNER

BY
C. A. Gullbrandsen

ATTY.

INVENTOR.
ALFRED H. FAULKNER
BY
C. A. Gulbrandsen
ATTY.

3,114,006
Patented Dec. 10, 1963

3,114,006

DATA STORAGE UNIT

Alfred H. Faulkner, Redondo Beach, Calif., assignor to Automatic Electric Laboratories, Inc., a corporation of Delaware Filed Apr. 9, 1958, Ser. No. 727,412
3 Claims. (Cl. 179—18)

This invention relates to magnetic memory storage systems and more particularly to a system utilizing a rotating magnetic surface as the storage media.

It is an object of the present invention to provide a single magnetic drum capable of storing information received in decimal form from a number of sources and transmitting this information in the form of an interrupted series of discrete pulses of uniform length.

It is a further object of the invention to provide a drum storage system having a number of peripheral tracks. Each of these tracks is individually and permanently allocated to a single data initiating station such as an operator's position. Thus a simplified control mechanism can be used in conjunction with each station to perform all the required control functions.

A feature of the invention consists in the use of a pulse positioning control unit for providing both of the additive components of the signal which triggers the "and" gate of the writing circuit to write on the drum. In this manner costly coincidence counting chains are eliminated.

A further feature consists of a "rewrite" head disposed at a fixed angle from the "read" head to write a digit one less in value than the digit read out, both of these functions occurring during the same revolution of the drum. In this manner, a countdown sequence may be achieved.

The system as described herein includes a drum storage unit having a magnetizable cylindrical storage surface in which magnetizable spots are considered as arrayed in a number of parallel peripheral tracks or channels and further arrayed in a number of longitudinal bands spaced circumferentially from one another on the surface of the cylinder. Each track is allocated to a specific data initiating station shown in the drawings as a keyset. The drum output is shown as transmitted to a sender control of any type generally known in telephone usage which is receptive to interrupted dial pulses.

The drum surface can be considered, of course, as comprising 360° of rotation. This circumference of 360° is divided into 12 major intervals or arc segments of 30° each. Ten of these intervals are utilized to provide a storage space for each of the ten possible values of digits, the remaining two acting as blanks. Each of the major intervals is divided into ten minor intervals of 3° each. These are provided to record a ten digit sequence with fixed positions for the storage of each possible digit value of a sequence. For example, if the digit 3 is to be recorded as the first digit it would appear in the third major interval, first minor interval. Assuming a second digit of 3, it would be recorded in the third major interval, second minor. A next digit of 3 would be recorded in major interval 3, minor interval 3. Thus the number 333 would have been recorded on a single storage track on the drum surface.

Figure 3:
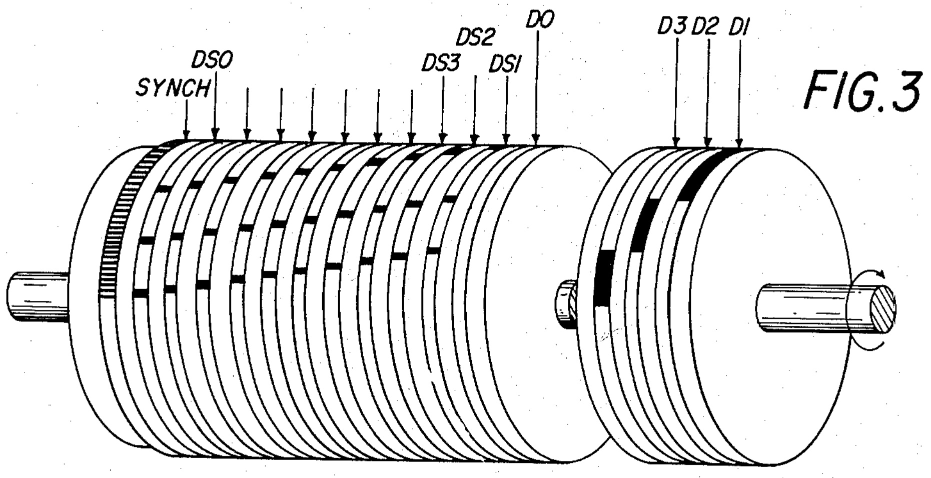
FIG. 3 shows a mechanical or magnetic commutation apparatus employing the chart design of FIG. 2 for use as the control section.

To most readily understand the present invention, the pulse position chart of FIG. 2 as applied to FIG. 3 will be explained first. The embodiment of FIG. 3 may be considered as a magnetic drum with permanently magnetized markings in the positions shown in the drawings. A transducer to read the markings must be provided for each channel or track. In the embodiment of FIG. 3 these would be magnetic heads as indicated by arrows designated D1–D0, DS1–DS0, and Synch adjacent each track. The drum of FIG. 3 is rotated at a speed in synchronism with the storage section of the drum which is rotated at a speed of 10 revolutions per second. The major and minor intervals previously explained for the storage section of the drum are used also in the control section. The storage section of the magnetic drum shown in FIGURE 1 and the control sections shown in FIGURES 3 or 4 may be driven by the same shaft or by any common mechanism to insure that both rotate in synchronism and at the same speed.

Figures 1, 2:
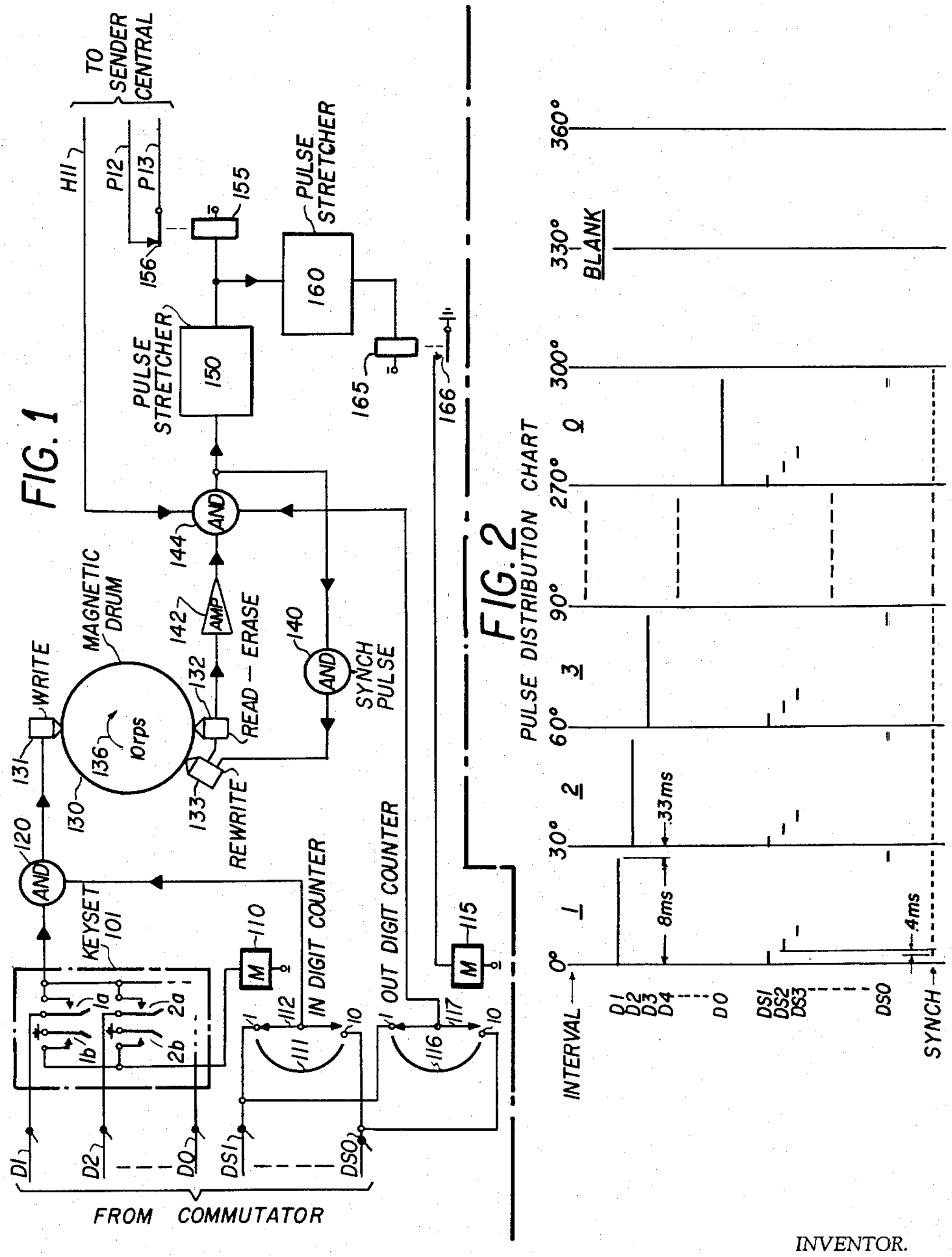
FIG. 1 shows the circuit and equipment necessary at each station including one drum track.
FIG. 2 shows diagrammatically the pulse distribution chart of the timing mechanism as used for control purposes.

The control section of the drum as shown in FIG. 3 has an outer surface whose cylindrical projection would appear in the form of the rectangular chart shown in FIG. 2. In FIG. 2 are shown twenty one horizontal strips designated D1–D0, DS1–DS0, and Synch. Each of these strips represents a track on a drum as shown in FIG. 3. The D1–D0 tracks each represent a possible digit value 1–0. Each of these tracks has a single permanently magnetized marking within it. These individually occur in the major interval representing the digit value of the track. Thus D1 track has a marking in the first major interval, D2 in the second . . . D0 in the tenth interval. The last two major intervals remain blank. With a rotation speed of 10 revolutions per second, each major interval is of 8.33 milliseconds duration and each of the permanent markings is of 8.0 milliseconds duration with a 0.33 millisecond gap before the start of the next major interval.

The tracks DS1–DS0 represent the digits of a possible ten digit sequence. Each of these tracks has ten short duration permanent markings, one in each of the major intervals. The DS1 track has a short duration marking in the first minor interval of each of the used major intervals. These markings each have a duration of 0.8 millisecond. The DS2 track has an 0.8 ms. marking in the second minor interval of each used major interval. This succession continues through the DS0 track which has markings in the tenth minor interval of each used major interval.

Each major interval as pointed out has a duration of 8.33 ms. and since there are ten minor intervals each of 0.8 ms. duration there is a 0.33 ms. pause at the end of each tenth minor interval.

The bottom track Synch shown in FIG. 2 consists of a series of markings of 0.4 ms. duration. These occur during the last half of each minor interval and have a 0.4 ms. gap between successive markings. After the tenth marking in a major interval there is, as previously pointed, a 0.33 ms. gap so that there is in actuality a 0.73 ms. gap between the last Synch marking in a major interval and the first in the next major interval.

The final two major intervals or segments of the surface shown as from 300° to 360° of rotation remain blank in all of the tracks. Since the coincidence of markings between the D tracks and the DS tracks is all that is required to trigger the writing sequence, no use is made of these two major intervals. In the reading sequence, the Synch markings and DS markings coincide with pulses previously stored to trigger the output circuit. In this manner, only coinciding signals from the control section are used to operate the system and no external or timing pulses are required as is true in most magnetic drum systems.

The structure of the system as shown in FIG. 1 is as follows:

The keyset 101 is a standard telephone type having ten digit keys for the digit values 1–0. Each of these keys 1–0 has a contact of a first set (*1a*, *2a* . . . *0a*) connecting to leads D1, D2 . . . D0. These leads D1–D0 are connected (using the control commutator embodiment) individually to the reading heads representatively shown in FIG. 3 as arrows.

The DS1–DS0 tracks of the control section or commutator are connected through the magnetic reading heads to individual contacts of in-counter switch bank 111. These connections are multipled to like contacts on the bank 116 of out-counter switch.

Thus, when the first digit of a series is to be transmitted, wiper 112 of the in-counter switch is at its normal position resting on the first contacts of bank 111 which is connected to DS1 lead. The system is ready to store digits. Assume digits 210 are to be stored and transmitted. Key 2 in the keyset is depressed first. At contacts *2b* ground is closed to motor magnet 110 energizing it. The switch is an indirect drive one and does not step at this time. At contacts *2a* lead D2 from the D2 control commutator head is closed to "and" gate 120. Also, lead DS1 is closed from its control commutator head through the first contact of bank 111, wiper 112 to the "and" gate 120. The key 2 will normally be depressed for at least one tenth of a second or one revolution of the drum. During this revolution when second major interval (30°–60° in FIG. 2) passes the write head 131, an impulse is sent from the control track D2 to "and" gate 120. During this major interval, an impulse is received from the DS1 head during the first minor interval. The coincidence of the pulses from tracks D2 and DS1 allows a pulse to be transmitted through "and" gate 120 to write head 131 which magnetizes a spot in the equivalent position on its track in the second major interval, first minor interval. When the key is released ground is removed from motor magnet 110 which then restores and steps its wiper 112 to the second contacts on bank 111 which is connected to lead DS2.

The key 1 of keyset 101 is depressed to initiate the second digit of the sequence which closes ground again to motor magnet 110. Lead D1 is closed from the control track head D1 through contact *1a* to "and" gate 120. While the first major interval is passing the control heads, an 8.0 millisecond pulse is sent to "and" gate 120. When the second minor interval of the first major interval passes the heads, an .8 millisecond pulse is sent from the DS2 control track through bank 111, wiper 112 to "and" gate 120. Coincidence of the D1 and DS2 impulses allows a pulse to be transmitted through "and" gate 120 and a magnetic spot is written by write head 131 in the proper position (first major interval, second minor interval). Release of key 1, releases motor magnet 110, allowing wiper 112 to step to the next contact of bank 111 which corresponds to lead DS3. To store the third digit 0, the digit key 0 is depressed, again energizing motor magnet 110. The D0 lead is closed through contacts *0a* to "and" gate 120. When the tenth major interval is reached an .8 millisecond pulse is sent back on lead DS0. When during this interval a pulse is received on DS3 through wiper 112, a coincidence pulse is transmitted through the "and" gate 120 to write head 131 and a magnetic spot is registered as third digit, 0 value. When the digit key 0 is released, motor magnet 110 steps wiper 112 to the next contact DS4 prepared to write the next digit on the drum. A maximum of ten digital spots may be stored sequentially in this manner.

To read out the digits 210 previously stored, the operation is as follows:

When lead H11 is open, this condition indicates to "and" gate 144 that the sender control circuit is ready to receive stored digital impulses. With the outcounter switch wiper 117 normally resting on the bank contact to lead DS1, an 0.8 millisecond pulse is sent from the control tracks on lead DS1 in the first minor interval of each major interval. These pulses correspond to those shown representatively in FIG. 2. All stored spots in the specific storage track are read by read head 132 and fed as pulses through amplifier 142 to "and" gate 144. When one of these read pulses coincides with a corresponding pulse from the control section over lead DS1 to "and" gate 144, a coincidence pulse is then fed through the "and" gate. In the case of the first digit 2 previously stored, a coincidence pulse at "and" gate 144 will occur during the second major interval, first minor interval. The output from "and" gate 144 is fed two ways. The first output is fed through pulse stretcher 150 to initiate its cycle and also to operate relay 115. Relay 155 on operation opens contacts 156 to the sender control to apply the first output pulse thereto. Relay 155 remains operated for the duration of the stretched pulse cycle which would last for about 55 ms. This stretched pulse conforms generally to the length of an interrupted dial pulse (10 pulses per second, 60% break). The output from pulse stretcher 150 also initiates the operation of pulse stretcher 160 having a cycle duration of 300 ms. and serially operates relay 165. Relay 165 on operating closes contacts 166 to energize the motor magnet 115 of the outer-counter. The pulse stretcher 160 may be any form of relay or electronic timing or delay device which holds relay 165 operated for a period of approximately 300 ms. after the last pulse at the rate of 10 pulses per second has been delivered thereto by pulse stretcher 150.

The second output of "and" gate 144 is fed to "and" gate 140. When this pulse to gate 140 coincides with a Synch pulse from the Synch track, an output pulse is fed serially through the rewrite head to the read and erase head 132. The effect of this pulse is as follows: Rewrite head magnetizes the spot on the storage track adjacent at that instant of time. As shown in FIG. 2 a Synch pulse is of half the length of a DS pulse and occurs during the second half of the DS pulse. As pointed out previously the rewrite head 133 is disposed 30° from the read head 132 forward in the direction of rotation. Thus when a spot in the second major interval triggers the rewrite head, this head is adjacent the identical spot in the first major interval and will write a pulse of .8 ms. duration there. Since the serial path through the rewrite head passes the read and erase head 132, the erase mechanism of the head is energized to erase the digital spot stored and previously read in the second major interval. This entire operation occurs during a single pass of the drum as outlined in an article entitled "Combined Reading and Writing on a Magnetic Drum" by J. H. McGuigan on page 1438 of the October, 1953 issue of the Proceedings of the IRE.

On the next revolution of the drum, a pulse from the DS1 track coincides with the restored spot in the first major interval to send an output pulse to pulse stretcher 150 to reoperate relay 155 and recycle pulse stretcher 160. Relay 155 on operation again opens contacts 156 which will then remain open for the duration of the stretched pulse output of stretcher 150 (55 ms.). The relay at that time releases and recloses contacts 156.

Also during this revolution the previously read spot is erased, written into the blank interval and thereby wasted.

Pulse stretcher 160 which has been recycled by the pulses through stretcher 150 maintains relay 165 operated for its cyclic time of 300 ms. after the last received pulse to provide an interdigital pause. In this particular instance the pause occurs after two output pulses have been sent to the sender control. No further digits are stored which can coincide with DS1 control pulses hence stretcher 150 continues through its cycle. At the conclusion of the cycles, relay 165 is released opening contacts 166. When contacts 166 open, motor magnet 115 releases and wiper 117 is stepped to the next bank contact which is the contact connected to lead DS2.

The second digit stored 1 may then be transmitted on receipt of the DS2 pulse in the first major interval. The cycle as explained previously is repeated sending out the one output pulse required and the interdigital pause. Wiper 117 after the pause is stepped to DS3 contact of bank 116. When a coincidence of DS3 pulse and the recorded spot in the tenth major interval is received by "and" gate 144, an output pulse is allowed to pass through the gate and a magnetic spot is stored in the ninth major interval. The series of pulses is continued in the previously described manner until ten have been sent to the sender control and then the circuit may send any further digits recorded.

If an output number using less than ten digits is required, a self-interrupted homing could be provided to return the switches to normal.

Lead H11 from the sender control is provided to introduce a stop sending notice. By application of a suitable potential to lead H11, a block pulse is transmitted to gate 144. Read and erase head 132 would continue to read pulses stored and amplify them, but by blocking the gate 144 the serial erasure path is blocked and no output pulses can be passed by the "and" gate 144. When the potential is removed, the output pulses can then be sent.

Circuit apparatus such as shown in FIG. 1 would be required for each initiating station used, the maximum being the maximum number of storage tracks on the drum surface. Each of the stations would have its keyset leads and bank contact leads commonly multipled to the control transducers to provide coincidence pulses for control and location of storage. Thus utilizing separate storage apparatus and tracks, each station could simultaneously store digits on the drum with no possible intermixing of pulses between input and output.

FIG. 3 shows representatively a mechanism which has been described as that of a magnetic drum having spots magnetized therein as shown with arrows—Synch, DS0, etc.—representing magnetic transducers each scanning the adjacent track for the permanently magnetized spots. FIG. 3 also could represent a mechanical commutator of any known design which is capable of operation at the synchronous speed required.

Figure 4:
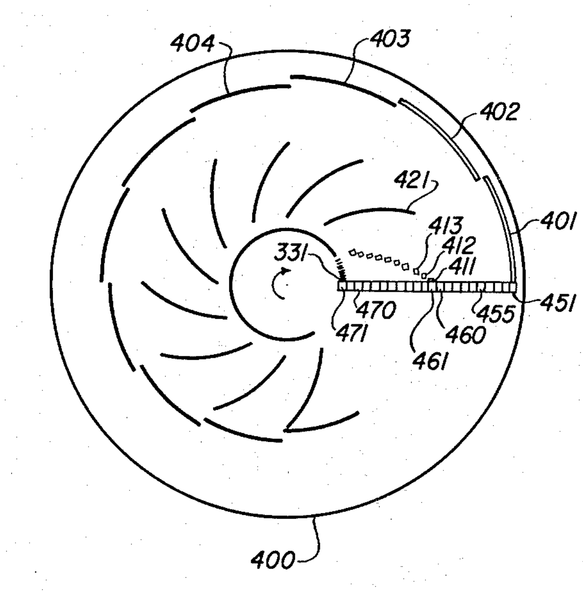
FIG. 4 shows a photo transistor commutator for use with the system as an alternative for FIG. 3.

FIG. 4 shows another form of commutator which could be used in the system as shown. Blocks 451—471 represent a series of photo transistors scanning gaps 401, 402, 403, etc., which are slits in the base sheet 400. Succeeding gaps as may be seen are each on a smaller radius than the preceding gap. These slits 401—400 serve the function of identifying the major intervals. Within each major interval are a series of small gaps 411, 412, etc., each set on a correspondingly smaller radius. These correspond to the minor intervals and there are ten per major interval as shown by 411, etc., and 421. An inner radius has a series of small gaps 331 set on the same radius to provide the Synch pulse for rewriting.

A light source is placed behind the sheet 400 and the sheet is rotated at the speed required, 10 revolutions per second. As the gaps pass the stationary row of phototransistors 451—471, they initiate a response in the transistor to form the pulses required for positioning as explained using a magnetic commutator.

The photo transistors of FIGURE 4 would be connected in circuits with the leads D1–D0, DS1 to DS0 and Synch in the same manner that the reader heads of FIG. 3 are connected so that when light strikes one of the transistors as the disc rotates, a circuit will be completed over the corresponding lead.

Embodiments other than those shown will become apparent when viewed in light of the present disclosure.

What is claimed is:

1. In a magnetic drum storage system, a control means comprising a magnetic drum section having a plurality of channels in a first and second set, each of said first set of channels representing a separate digit value, each of said second set of channels representing a separate sequential digit of a series, all of said channels subdivided into a plurality of equispaced segments, segments of both said sets having allocated thereto predetermined digit values of ascending order, a permanent marking in each of the channels of said first set corresponding to the digit allocated to that channel and having a duration analogous to the entire segment length, each of the channels of said second set having each segment divided into equi-spaced sub-segments, each of said sub-segments of a segment representing a separate digit of a sequence, each of the channels of said second set representing a separate digit of a sequence, each of said second set of channels having a single permanent marking in each segment corresponding to the sub-segment representing the numerical value of the digit of the individual channel, a transducer adjacent each channel, means for initiating an individual binary-decimal registration of a digit sequence including a plurality of operable digit keys of differing values each having a connection to the transducer of its representative channel of said first set, switch means having a plurality of bank contacts, each of said bank contacts sequentially connected to one of the transducers of a channel and each representing individually the digits in a sequence, coincidence means operated responsive to the operation of one of said keys which connects up the receptive to markings from an operated key and its channel and also responsive to markings from the switch and its selected channel, a storage section on said drum having a transducer for temporarily magnetizing spots thereon, said last transducer rendered operative on said operation of said coincidence means to complete the registration of said initiated digit during said coincidence period, the duration of said coincidence period comprising the equivalent of a sub-segment of a segment.

2. A pulse positioning apparatus for a constantly rotating magnetizable storage surface, comprising a magnetic drum unit having a first and a second set of tracks, each set in turn comprising a plurality of tracks rotated synchronously with said storage drum, each of said tracks having a transducer adjacent thereto for scanning said track, each of the tracks of said first set having a single major permanent marking therein for signalling the adjacent transducer, each of said permanent markings successively representing a separate digit of the possible decimal digits, said permanent markings each spaced to pass and signal the transducer during a separate different period in the rotation of the unit, each of the tracks of the second set having a plurality of short duration permanent markings therein each spaced to pass and signal the adjacent transducer during a separate period in the rotation of the unit, the short duration markings within each track occurring once during a like portion of the period of rotation of each of major permanent markings, a plurality of said short duration markings occurring during the period of each major marking, each of the tracks of the second set successively representing the numerical order of a possible digit of a sequence, an input gate circuit, means for initiating a digit for storage on said surface, said means operated to connect the transducer of the path representing the initiated digit to said input gate circuit, means operated responsive to the operation of said first means in accordance with the position of a digit in a sequence for connecting the transducer adjacent the track representing the position of the initiated digit in the sequence to the input gate circuit, said gate circuit thereupon comparing the passed signals from the connected transducers and causing the initiated digit to be stored completely on said storage surface during the coincidence of response from a marking from said first set as compared to the marking from said second set.

3. In a pulse positioning arrangement for a magnetizable storage surface rotating at a constant speed, a control surface rotating in synchronism with said storage surface, said control surface having a plurality of channels, a plurality of phototransistors, one of said phototransistors individual to each of said channels for simultaneously scanning a reference point in the individual channel, said channels including a first and second plurality of channels, each of the channels of said first set having a slit therein, said slits aligned to be scanned by the individual phototransistors sequentially, each of the channels of said second set having a plurality of slits, the plurality of slits in each of the channels of said second set aligned to be scanned by the individual phototransistors sequentially during the scanning of each one of the slits in said first set of channels, a light source for providing a luminescence at each of said slits to be passed by said slits each of said phototransistors activated by passed luminescence to thereupon transmit a signal pulse, means for comparing a signal pulse from said first set of channels against pulses from said second set of channels to emit a coincidence pulse.

References Cited in the file of this patent

UNITED STATES PATENTS

| | | |
|---|---|---|
| 2,723,311 | Malthaner et al. | Nov. 8, 1955 |
| 2,764,634 | Brooks et al. | Sept. 25, 1956 |
| 2,798,554 | Smith | July 4, 1957 |
| 2,817,072 | Chien et al. | Dec. 17, 1957 |
| 2,958,850 | Glenner et al. | Nov. 1, 1960 |
| 2,975,236 | Glenner et al. | Mar. 14, 1961 |